(No Model.)

J. K. POOLE.
CLEVIS HOOK.

No. 508,338. Patented Nov. 7, 1893.

Inventor
James K. Poole,
By his Attorneys,

Witnesses
C. A. Ford
W. S. Duvall

UNITED STATES PATENT OFFICE.

JAMES K. POOLE, OF LYTCH, ASSIGNOR TO M. M. McKINNON, OF LAURINBURG, NORTH CAROLINA.

CLEVIS-HOOK.

SPECIFICATION forming part of Letters Patent No. 508,338, dated November 7, 1893.

Application filed June 30, 1893. Serial No. 479,292. (No model.)

*To all whom it may concern:*

Be it known that I, JAMES K. POOLE, a citizen of the United States, residing at Lytch, in the county of Richmond and State of North Carolina, have invented a new and useful Clevis-Hook, of which the following is a specification.

My invention relates to improvements in clevis hooks; the objects in view being to produce a hook of simple and economical construction to be employed upon plows and to be so constructed as to obviate the necessity of the employment of the usual intermediate ring between the D-eye or loop of the single or double-tree and the clevis; to so form the hook as to prevent any accidental disengagement of the D-eye or loop with the same and yet permit of a ready disengagement when desired without the necessity of unhitching the draft animals; and, furthermore, to so connect the said hook with the beam of the plow that any slight deviation from a straight line by the draft animal or animals will not affect the accurate running or alignment of the plow.

Other objects and advantages of the invention will appear in the following description and the novel features thereof will be particularly pointed out in the claims.

Figure 1:
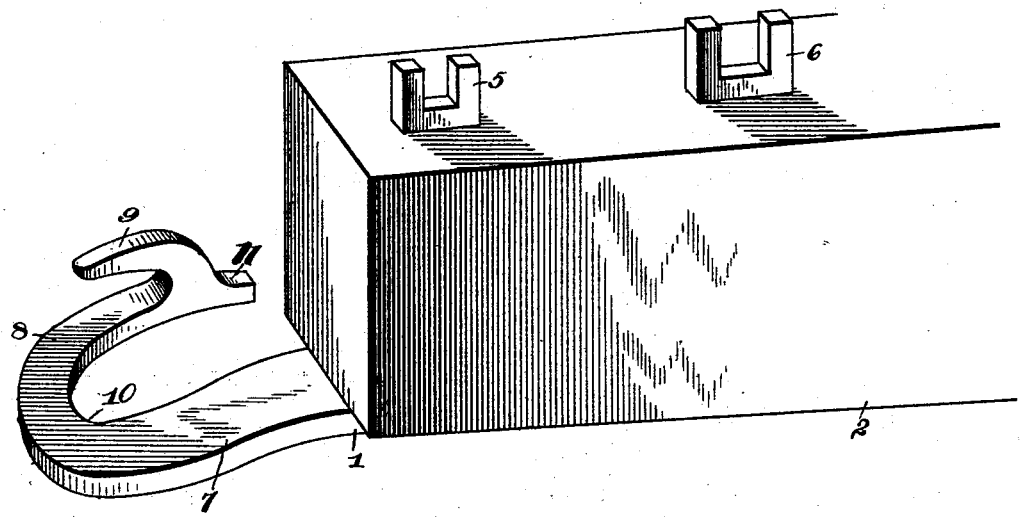
Figure 2:
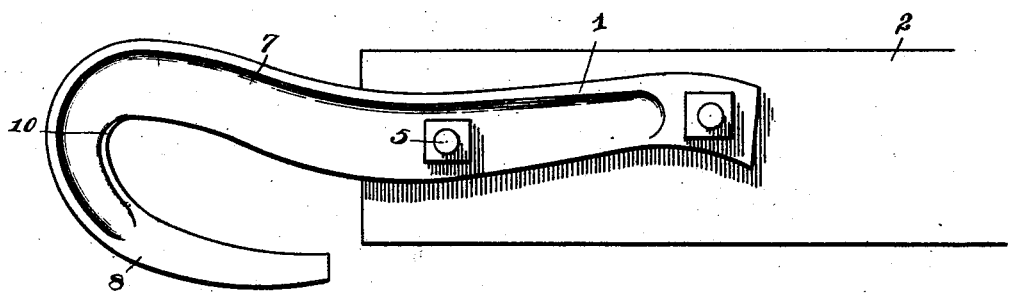
Figure 3:
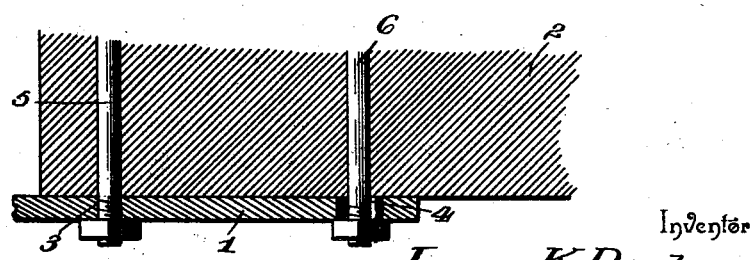

Referring to the drawings:—Figure 1 is a perspective view of the front end of a plow-beam, the same being provided with a hook formed in accordance with my invention. Fig. 2 is an inverted plan view. Fig. 3 is a longitudinal sectional view of the front end of the plow-beam and the shank of the hook.

Like numerals of reference indicate like parts in all the figures of the drawings.

The shank 1 of the hook is of suitable length and is applied to the under side of the plow-beam 2, the said shank being provided with a front opening or bolt-hole 3 and with a rear opening or bolt-hole 4, the latter being considerably larger in diameter that the former. A bolt 5 passes through the front opening 3 and through the beam, the said bolt fitting the opening 3 and serving as a pivot bolt. The rear opening 4 receives a much smaller bolt 6, the same passing up through the beam as in the previous instance and permitting of a slight lateral movement upon the part of the rear end of the shank, all for a purpose hereinafter apparent. The shank is continued beyond the end of the beam and slightly laterally disposed forming a neck 7, and after continuing a short distance is laterally bent in an opposite direction and in the same plane forming the flat hook 8, which extends around to a point opposite the beginning of the neck, where being still further reduced it is upwardly bent, thence forwardly bent forming an upper guard hook 9. At the point where the neck 7 is deflected to form the hook 8 a ring-seat 10 is produced, the same being substantially in line with the shank 1, so that the draft is straight, and at the base of the guard hook 9 a rearwardly extended horizontal guard lug 11 is formed.

It will be seen that an ordinary D-eye or loop with which the single and double-trees are provided may, by proper manipulation, be engaged over the hook 9 and guard lug 11 and settled in the hook 8 without the interposition or employment of the usual intermediate ring, in that the D-eye is at a right angle to the plane of the hook, which is not the case with the ordinary clevis, and hence the necessity in the latter case of the presence of the ring. I thereby, it will be seen, avoid the expense of this ring, together with the inconvenience of its use arising from its liability of breaking and becoming misplaced. By the production of the guard-hook 9 and lug 11 all danger of accidental disengagement between the D-eye and clevis hook is avoided, and yet at the same time it will be seen that a desirable disengagement may be readily accomplished at any time without the necessity of unhitching the draft animal or animals by bringing the D-eye to the first or position of application. It will further be seen that, as before stated, the hook is capable of a slight pivotal movement upon its bolt 5, this being permitted by reason of the fact that the bolt opening 4 is considerably larger in diameter than the bolt 6 which serves to secure the rear end of the shank to the beam. The purpose and advantage of this is that oftentimes the animal or animals drawing the plow will deviate from a straight line, and were the shank rigid with the beam any such deviation however slight would be instantly communicated to the plow, resulting in a crooked furrow. The deviation is always slight, in that the operator watching the animals would instantly return them to their proper positions, and I therefore provide for this slight oscillation of the hook so that when such deviation occurs it will not be communicated to the plow-point, and before it should become sufficient to influence the plow the operator or plowman would correct it by a pull on the lines.

Having described my invention, what I claim is—

1. The herein described improved clevis-hook, the same consisting of the shank 1 provided with bolt holes whereby it is adapted to be fastened to the plow, the said shank beyond its bolt-holes being slightly reduced and laterally bent or curved to form a neck 7 and beyond said neck laterally bent in a reverse direction to a point about opposite the beginning of the neck forming a ring-seat 10, in substantial alignment with the shank, and a hook 8, the extremity of said hook being bent upwardly and forwardly forming the guard-hook 9, substantially as specified.

2. The herein described improved clevis-hook, the same consisting of the shank 1 provided with bolt-holes whereby it is adapted to be fastened to the plow, the said shank beyond its bolt-holes being slightly reduced and laterally bent or curved to form a neck 7 and beyond said neck laterally bent in a reverse direction to a point about opposite the beginning of the neck forming a ring-seat 10, in substantial alignment with the shank, and a hook 8, the extremity of said hook being bent upwardly and forwardly forming the guard-hook 9, and provided at the base of the hook 9 with a rearward, horizontally disposed guard lug 11, substantially as specified.

In testimony that I claim the foregoing as my own I have hereto affixed my signature in the presence of two witnesses.

JAMES K. POOLE.

Witnesses:
J. K. MCEACHIN,
R. E. L. GRAHAM.